(12) United States Patent
Shiimoto et al.

(10) Patent No.: US 8,582,225 B2
(45) Date of Patent: Nov. 12, 2013

(54) MICROWAVE-ASSISTED MAGNETIC RECORDING HEAD AND MAGNETIC READ/WRITE APPARATUS USING THE SAME

(75) Inventors: Masato Shiimoto, Odawara (JP); Masukazu Igarashi, Kawagoe (JP); Masaru Furukawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 319 days.

(21) Appl. No.: 13/019,002

(22) Filed: Feb. 1, 2011

(65) Prior Publication Data
US 2011/0216435 A1 Sep. 8, 2011

(30) Foreign Application Priority Data

Mar. 4, 2010 (JP) ................... 2010-048120

(51) Int. Cl.
*G11B 5/02* (2006.01)
*G11B 5/33* (2006.01)
*G11B 5/127* (2006.01)

(52) U.S. Cl.
USPC .......................................... 360/59; 360/324

(58) Field of Classification Search
None
See application file for complete search history.

(56) References Cited

U.S. PATENT DOCUMENTS

| | | | |
|---|---|---|---|
| 7,558,022 B2 | 7/2009 | Kurita et al. | |
| 2005/0023938 A1 | 2/2005 | Sato et al. | |
| 2005/0213250 A1 | 9/2005 | Kurita et al. | |
| 2009/0052095 A1* | 2/2009 | Yamada et al. | 360/324 |
| 2009/0059418 A1 | 3/2009 | Takeo et al. | |
| 2011/0043943 A1* | 2/2011 | Igarashi et al. | 360/59 |

FOREIGN PATENT DOCUMENTS

| | | |
|---|---|---|
| JP | 07-244801 | 9/1995 |
| JP | 2005-025831 | 1/2005 |
| JP | 2008-186549 A | 8/2008 |
| JP | 4255869 | 2/2009 |
| JP | 2009-064500 A | 3/2009 |
| JP | 4255869 B2 | 4/2009 |

OTHER PUBLICATIONS

Kiselev, S.I.; et al.; Microwave oscillations of a nanomagnet driven by a spin-polarized current; Nature, vol. 425, Sep. 25, 2003; pp. 380-383; Nature publishing Group.

Wang, Yiming; et al.; Media damping constant and performance characteristics in microwave assisted magnetic recording with circular ac field; Journal of Applied Physics 105, 07B902 (2009); 3 pages; American Institute of Physics.

Zhu, Jian-Gang, et al.; Microwave Assisted Magnetic Recording; IEEE Transactions on Magnetics. vol. 44, No. 1, Jan. 2008; pp. 125-131.

Japanese Patent Office action on application 2010-048120 dated Jun. 25, 2013; pp. 1-3.

* cited by examiner

Primary Examiner — Regina N Holder
(74) Attorney, Agent, or Firm — Foley & Lardner LLP

(57) ABSTRACT

A microwave-assisted magnetic recording head includes: a main magnetic pole that generates a recording magnetic field to be recorded on a magnetic recording medium; a shield; and an oscillator that is provided between the main magnetic pole and the shield and generates a microwave magnetic field. The microwave-assisted magnetic recording head is provided with a thermal expansion device for adjusting a relative position between the oscillator and the main magnetic pole so as to be able to independently adjust a recording magnetic field from the main magnetic pole and a microwave magnetic field from the oscillator.

12 Claims, 11 Drawing Sheets

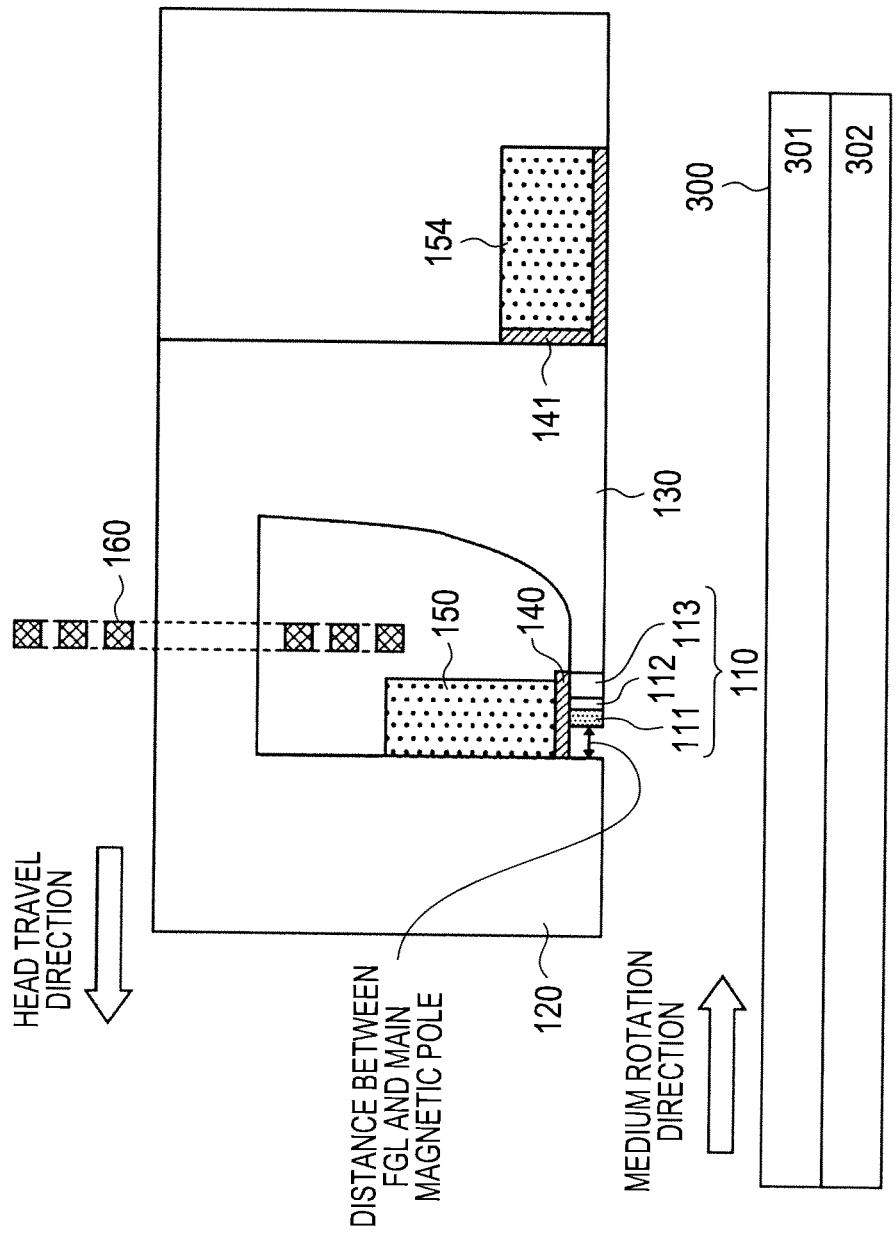

MICROWAVE-ASSISTED MAGNETIC RECORDING HEAD AND MAGNETIC READ/WRITE APPARATUS USING THE SAME

CLAIM OF PRIORITY

The present application claims priority from Japanese patent application JP2010-48120 filed on Mar. 4, 2010, the content of which is hereby incorporated by reference into this application.

BACKGROUND OF THE INVENTION

1. Field of the Invention

The present invention relates to a magnetic recording head having a function of inducing magnetization reversal by applying a microwave magnetic field to a magnetic recording medium and relates to a magnetic read/write apparatus using the magnetic recording head.

2. Description of the Related Art

Recently, a recording density on magnetic read/write apparatuses such as HDDs (Hard Disk Drives) is requested to increase as fast as 40% per year. The surface recording density is expected to become one Tbit/in$^2$ by the year 2012. Improvement of the surface recording density requires miniaturizing magnetic write and read heads and reducing particle sizes for magnetic recording media. However, miniaturizing a magnetic write head decreases the recording magnetic field strength. This may cause insufficient recording capability. Reducing particle sizes for magnetic recording media makes the thermal fluctuation apparent. The particle size reduction also requires increasing the coercive force and the anisotropic energy. As a result, recording becomes difficult. Improvement of the recording capability is the key to improvement of the surface recording density. To address this problem, the assisted recording is proposed. The assisted recording applies heat or a microwave magnetic field to temporarily decrease the coercive force of a magnetic recording medium only during recording. For example, Patent Document 1 describes an assisted recording technique that applies heat.

An assisted recording technique of applying a microwave magnetic field is termed "microwave assisted magnetic recording" (MAMR) and receives much attention recently. MAMR applies a microwave magnetic field to a nanometer region and locally excites the recording medium to record information while reducing magnetization reversal magnetic fields. Since the magnetic resonance is used, greatly reducing a magnetization reversal magnetic field requires using a strong microwave magnetic field having a frequency that is proportional to the anisotropy field of recording media. Patent document 2 discloses a microwave oscillator that generates a microwave-assisted magnetic field and is structured to sandwich a laminated film structured similarly to a GMR device (Giant Magneto Resistive device) between electrodes. The microwave oscillator can generate a tiny microwave oscillation magnetic field. To do this, the microwave oscillator injects a conduction electron having spin fluctuation generated in the GMR structure into a magnetic material via a nonmagnetic material. Non-patent document 1 reports the microwave oscillation based on spin torque. Non-patent document 2 describes "Microwave Assisted Magnetic Recording." According to the technology, a microwave magnetic field generation layer or a Field Generation Layer (FGL) fast rotates based on spin torque and is provided near a magnetic recording medium adjacent to the main magnetic pole of a vertical magnetic head. The layer generates microwave (microwave magnetic field) to record information on a magnetic recording medium having large magnetic anisotropy. Non-patent document 3 discloses the technology that efficiently assists magnetization reversal on magnetic recording media. For this purpose, an oscillator is provided between the main magnetic pole of a magnetic recording head and a shield at the rear of the main magnetic pole. The rotation of a microwave magnetic field is varied in accordance with the recording magnetic field polarity. The shield is widely used for magnetic heads as current products in order to improve the recording magnetic field gradient along a head travel direction. For MAMR, the shield is used to change the rotation direction of the microwave magnetic field for an oscillator in accordance with the recording magnetic field polarity. The magnetization efficiently reverses when the microwave magnetic field of the oscillator rotates in the same direction as the precession movement of magnetization on a magnetic recording medium to be reversely magnetized. This technology can assist the magnetization reversal using the microwave magnetic field that always ensures an efficient rotation direction.

RELATED ART REFERENCES

Patent Documents:
  Patent Document 1: Japanese Patent Application Laid-Open Publication No. 7 (1995)-244801
  Patent Document 2: Japanese Patent Application Laid-Open Publication No. 2005-025831
  Patent Document 3: Japanese Patent No. 4255869
Non-Patent Documents:
  Non-patent Document 1: Nature, Vol 425, pp 380 (2003)
  Non-patent Document 2: J-G. Zhu, et. al, Microwave Assisted Magnetic Recording, IEEE trans. Magn., Vol 44, No. 1, pp 125 (2008)
  Non-patent Document 3: Y. Wang, et. al, Media damping constant and performance characteristics in microwave assisted magnetic recording with circular ac field, Journal of Applied Physics, Vol 105, pp 07B902 (2009)

BRIEF SUMMARY OF THE INVENTION

The recent magnetic recording requests the recording density of over 1 Tb/in$^2$. To provide such a recording density using MAMR, a strong microwave magnetic field needs to be radiated to a nanometer region to locally resonate a magnetic recording medium magnetically and reduce magnetization reversal magnetic fields for recording information. The technologies disclosed in patent documents 1 and 2 and non-patent document 1 make it difficult to provide a high recording density of 1 Tb/in$^2$ because the oscillated microwave magnetic field provides too low a frequency or too weak a magnetic field strength.

It is reported that the technology disclosed in non-patent document 2 or 3 can be used to provide the recording density of 1 Tb/in$^2$ or higher. Using micromagnetic simulation, the inventors examined to what degree the MAMR technology described in non-patent document 3 can improve the recording density. We focused attention on how the recording signal quality and the magnetic track width relate to the microwave magnetic field strength, a frequency, or a recording head magnetic field supplied from the oscillator. Improving the signal quality increases the linear recording density. Generally, the SNR (Signal-to-Noise Ratio) is used as an index to indicate the signal quality. Narrowing the magnetic track width improves the track density. The MWW (Magnetic Write Width) is used as an index. After the examination, we found that the recording density of 1 Tb/in² or higher can be expected from the configuration described in non-patent document 3.

However, we found that the microwave magnetic field strength, the frequency, and the recording head magnetic field strength all need to be optimized in accordance with the vertical anisotropy magnetic field of a magnetic recording medium in order to provide the recording density of 1 Tb/in² or higher. We also found that the range of optimal values is very narrow. Specifically, an approximate 10% decrease or increase in the optimum frequency for the microwave magnetic field greatly degrades the SNR. The microwave magnetic field strength and the recording magnetic field strength, when larger than optimum values, increase the MWW and, when smaller than optimum values, degrade the SNR. When the microwave magnetic field strength or the recording head magnetic field strength is approximately 10% higher than the optimum value, the MWW increases approximately 1.5 times a value recorded under an optimal condition and the recording density decreases down to approximately 60%. The MAMR technology must optimize the recording head magnetic field strength and the microwave magnetic field strength.

It is impossible to independently control the microwave magnetic field strength, the frequency, and the recording magnetic field strength after manufacture of magnetic recording heads. For example, non-patent document 2 describes that the amount of current supplied to an oscillator can control the microwave magnetic field frequency. At the same time, however, a rotation axis angle varies from inside the oscillator and the microwave magnetic field strength also varies accordingly. Varying a recording current applied to the recording head can control a recording head magnetic field. The magnetic field strength applied to the oscillator varies accordingly and the oscillation frequency for the microwave magnetic field also varies. A thermal expansion device mounted on an ordinary magnetic read/write head can control distances from the main magnetic pole and the oscillator to the magnetic recording medium surface and therefore vary the microwave magnetic field strength and the recording magnetic field strength. However, distances from the main magnetic pole and the oscillator to the magnetic recording medium surface always vary in relation to each other. The microwave magnetic field strength and the recording magnetic field strength cannot be controlled independently.

Even though the presently disclosed MAMR configuration provides a very narrow range of optimum values for the microwave magnetic field frequency, the microwave magnetic field strength, and the recording magnetic field strength, the magnetic read/write apparatus cannot control these parameters independently. This problem may be fatal to manufacture of magnetic read/write apparatuses. This is because recording heads of actual magnetic read/write apparatuses are inevitably subject to variations due to manufacturing process errors. Generally, the recording magnetic field strength varies approximately 10%. Existing recording techniques can correct the variation to some extent by optimizing a recording current or a distance between the recording medium surface and the magnetic head. However, the MAMR technology cannot do so for the above-mentioned reason. Just a 10% variation in the recording magnetic field strength consequently decreases the recording density down to approximately 60%.

It is an object of the invention to provide a magnetic recording head or a magnetic read/write apparatus capable of providing high recording density for microwave-assisted recording using an oscillator generating a microwave magnetic field by independently optimizing the microwave magnetic field strength, frequencies, and the recording magnetic field strength of the magnetic recording head and thereby correcting manufacturing variations for the magnetic recording head or the oscillator.

To address the above-mentioned problem, the present invention uses a magnetic recording head based on microwave assisted magnetic recording (MAMR) for recording a signal on a magnetic recording medium. The magnetic recording head is provided with an oscillator that can apply a microwave magnetic field for reversing magnetization of magnetic recording media.

The oscillator needs to be configured to include a microwave magnetic field generation layer (FGL) that oscillates a microwave to apply a microwave magnetic field to a magnetic recording medium. The magnetic recording head needs to be configured to include a main magnetic pole for applying a magnetic field toward the magnetic recording medium. The main magnetic pole can be provided with a pole at its front and/or rear in a magnetic head travel direction. According to the configuration, the oscillator needs to be provided between the recording head and the shield. When the shield is provided at the front and the rear of the main magnetic pole, a side shield may be provided outside the main magnetic pole in a track width direction.

A relative position between the main magnetic pole and the oscillator according to the invention is adjusted on the magnetic recording head mounted with the oscillator. It is possible to independently adjust the recording head magnetic field strength and the microwave magnetic field strength applied to the magnetic recording medium. As a result, it is possible to prevent an increase in MWW and/or a decrease in SNR due to manufacturing variations in the recording head and the oscillator and prevent the recording density from degrading.

The following describes specific methods (A) and (B) of independently adjusting the microwave magnetic field strength and the recording head magnetic field strength. These methods may be combined appropriately.

(A) A method of independently adjusting a magnetic field strength from the main magnetic pole and a microwave magnetic field strength from the oscillator to be applied to a magnetic recording medium. The method adjusts a relative distance between a bottom face of the main magnetic pole for the recording head and a bottom face of the oscillator along a direction toward the magnetic recording medium.

(B) Another method of independently adjusting a magnetic field strength from the main magnetic pole and a microwave magnetic field strength from the oscillator to be applied to a magnetic recording medium. The method adjusts a relative distance between the main magnetic pole for the recording head and the oscillator along a head travel direction.

The following configurations are provided to enable methods (A) and (B).

(1) A first thermal expansion device is provided near the top of the oscillator with reference to the magnetic recording medium. An insulation layer made of an insulating material is provided between the first thermal expansion device and the oscillator. An electrode and a current source are provided to adjust the temperature of the first thermal expansion device in accordance with the supplied current.

(2) A second thermal expansion device for adjusting the oscillator position is provided opposite the oscillator viewed from the shield in the head travel direction. An insulation layer made of an insulating material is provided between the second thermal expansion device and the shield. An electrode and a current source are provided to adjust the temperature of the second thermal expansion device in accordance with the supplied current.

(3) A first thermal expansion device is provided near the top of the oscillator viewed from the magnetic recording medium in order to adjust the oscillator position in the height direction. An insulation layer made of an insulating material is provided between the first thermal expansion device and the oscillator. An electrode and a current source are provided to adjust the temperature of the first thermal expansion device in accordance with the supplied current. A second thermal expansion device for adjusting the oscillator position is provided opposite the oscillator viewed from the shield in the head travel direction. An insulation layer made of an insulating material is provided between the second thermal expansion device and the shield. An electrode and a current source are provided to adjust the temperature of the second thermal expansion device in accordance with the supplied current.

An aspect of the present invention can provide a magnetic recording head mounted with a microwave oscillator capable of recording high-density patterns at an excellent SNR on a magnetic recording medium having high magnetic anisotropy energy. The invention can also provide a magnetic read/write apparatus including such magnetic recording head.

According to another aspect of the invention, the magnetic recording head mounted with the microwave oscillator provides the feature that can appropriately control relative positions for the main magnetic pole and the microwave oscillator of the magnetic recording head. It is possible to prevent the recording density from degrading due to manufacturing errors in the magnetic recording head and ensure high recording density.

BRIEF DESCRIPTION OF THE DRAWINGS

FIG. 15 shows a recording head section according to a fourth embodiment of the invention.

DETAILED DESCRIPTION OF THE INVENTION

Figure 1:
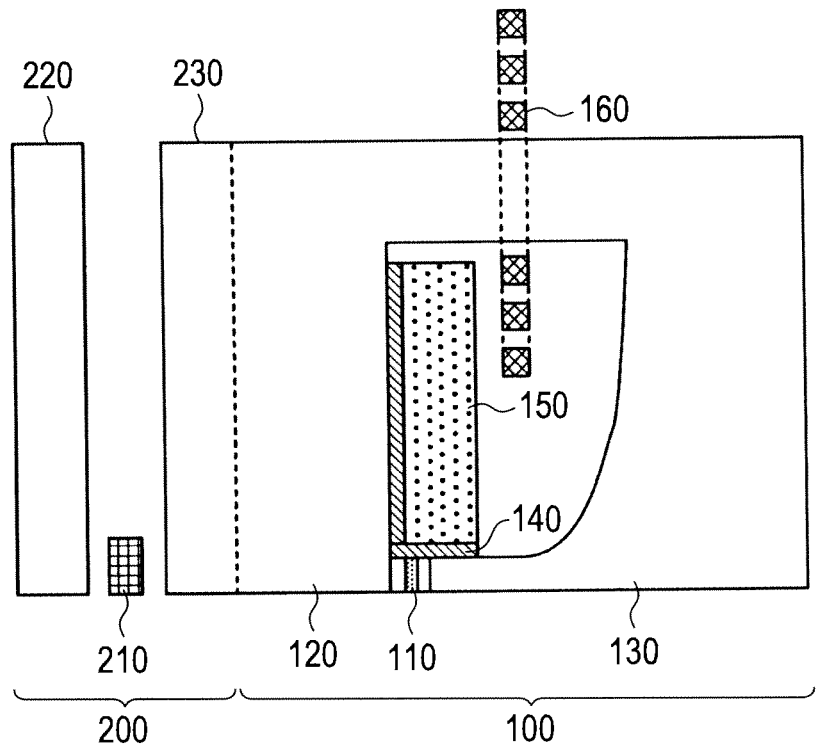
FIG. 1 is a schematic diagram showing a magnetic read/write head according to a first embodiment of the invention.

Embodiments of the present invention will be described in further detail with reference to the accompanying drawings. The same parts or components are depicted by the same reference numerals for ease of understanding.

First Embodiment

FIG. 1 shows a schematic diagram of a magnetic read/write head as part of a configuration example of the magnetic read/write apparatus according to the invention. The magnetic read/write head is separated for reading and writing and includes a recording head section 100 and a read head section 200. The recording head section 100 includes an oscillator 110, a main magnetic pole 120, a shield 130, a first thermal expansion device 150, an insulation layer 140, and a coil 160. The oscillator 110 generates a microwave magnetic field. The main magnetic pole 120 generates a recording head magnetic field. The shield 130 controls the magnetization rotation direction of the oscillator 110. The first thermal expansion device 150 adjusts the position of the oscillator toward a magnetic recording medium. The insulation layer 140 insulates the oscillator 110 from the first thermal expansion device 150. The coil 160 excites the main magnetic pole to generate a magnetic field. The feature of the present invention is the first thermal expansion device 150 provided at the top of the oscillator 110. This makes it possible to efficiently vary a relative distance from bottom surfaces of the oscillator 110 and the main magnetic pole 120 to the medium surface. Specific means and effects for this feature will be described later. Further, a third thermal expansion device is provided to control the floating quantity of the entire magnetic read/write head with reference to the magnetic recording medium. The third thermal expansion device can be placed at the top of the magnetic read/write apparatus. The third thermal expansion device is also used for existing magnetic read/write heads. The structure of the third thermal expansion device is described in patent document 3, for example. The third thermal expansion device can be provided at the top of the main magnetic pole 120 or the read head section 200. Though not shown in the drawing, a current supply terminal is provided for each of the coil 160, the oscillator 110, and the first thermal expansion device 150 and supplies current to these components.

The read head section 200 includes a read sensor 210, a lower magnetic shield 220, and an upper magnetic shield 230. The read sensor 210 just needs to be able to read a recorded signal and does not require any other special restrictions. The read sensor 210 may be configured to provide the GMR (Giant Magneto-Resistive) effect, the TMR (Tunneling Magneto-Resistive) effect, the EMR (Electro Mechanical Resonant) effect. The read sensor 210 may be also configured as a differential read sensor having two or more read sensors to respond to an external magnetic field using the reverse polarity. The lower magnetic shield 220 and the upper magnetic shield 230 are important to improvement of the read signal quality and are preferably provided. Though not shown in FIG. 1, the upper magnetic shield 230 also functions as an auxiliary magnetic pole for the recording head section 100.

Figure 2:
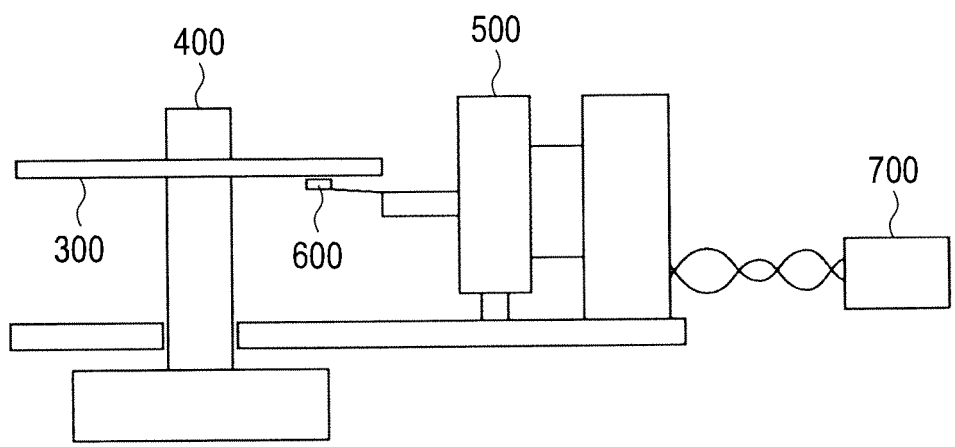
FIG. 2 shows an overall configuration of a magnetic read/write apparatus according to the invention.

FIG. 2 shows a configuration example of the magnetic read/write apparatus according to the invention. A spindle motor 400 rotates a magnetic recording medium 300. An actuator 500 guides a head slider 600 over a track on a magnetic recording medium 300. In a magnetic disk unit, a read head and a recording head are formed on the head slider 600. According to the mechanism, the read head and the recording head relatively move to a specified recording position over the magnetic recording medium 300 and write and read signals. The actuator 500 is preferably a rotary actuator. The recording head records a signal from a signal processing system 700 on a medium. An output from the read head is acquired as a signal from the signal processing system 700. The read head is moved over to a specified track as follows. A highly sensitive output from the read head is used to detect a position over the track. The actuator is controlled to position the head slider. FIG. 2 shows one head slider 600 and one magnetic recording medium 300. Two or more head sliders 600 and two or more magnetic recording media 300 may be provided. Information may be recorded on both sides of the magnetic recording medium 300. When information is recorded on both sides of a disk, the head slider 600 is provided for both sides of the magnetic recording medium 300.

Figure 3:
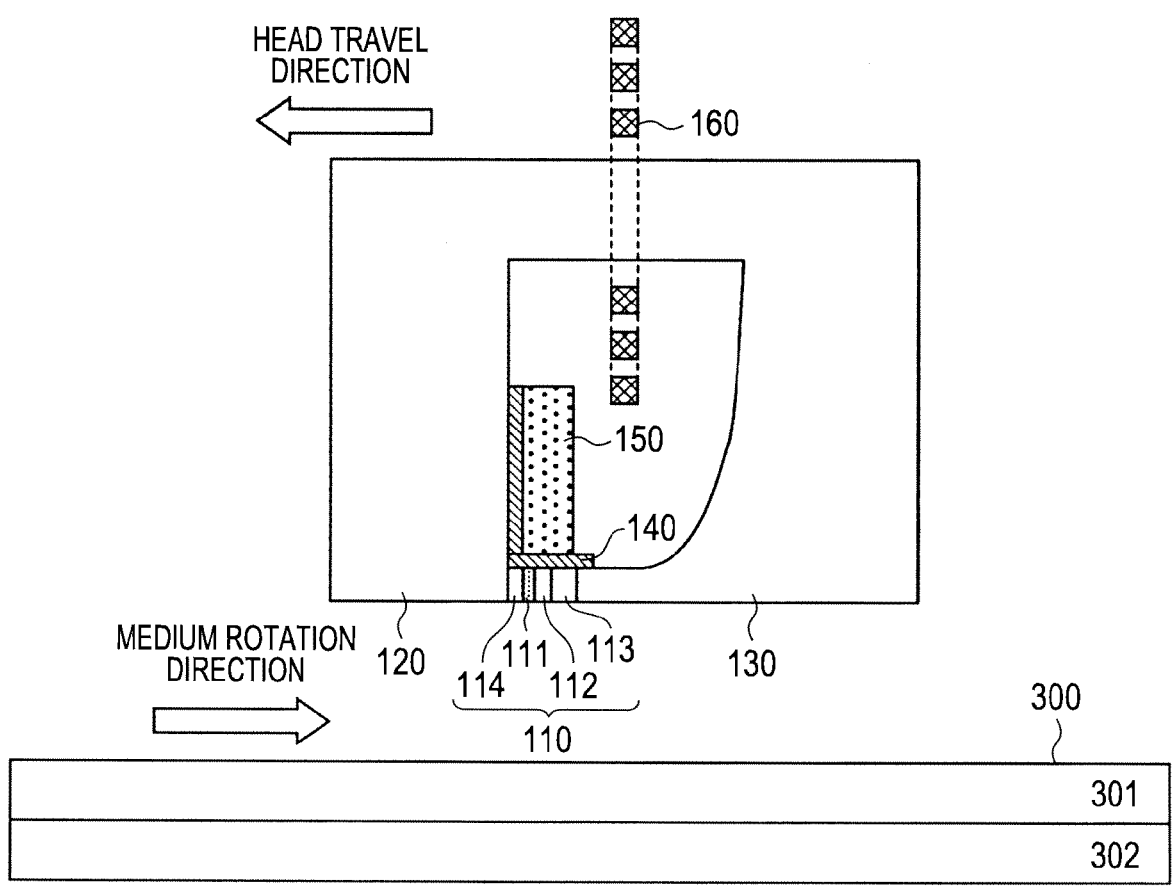
FIG. 3 shows details of a recording head section according to the first embodiment of the invention.

FIG. 3 shows a detailed configuration example of the recording head section 100 and the magnetic recording medium 300 according to the embodiment. According to the configuration of this embodiment, the magnetic read/write head travels in relation to rotation of the magnetic recording medium 300 so as to position the read head section 200 at the front and the recording head section 100 at the rear. The effect of the present invention is unaffected even when the magnetic read/write head is configured to travel in relation to rotation of the magnetic recording medium 300 so as to position the read head section 200 at the rear and the recording head section 100 at the front.

In FIG. 3, a recording layer of the magnetic recording medium 300 as a vertical recording medium is magnetized perpendicularly to an ABS surface. According to the embodiment, the magnetic recording medium 300 includes a recording layer 301 and a soft magnetic underlayer 302. It is preferable that a precession movement frequency for magnetizing the recording layer 301 approximately equals an oscillation frequency for the microwave magnetic field of the oscillator 110. The recording layer 301 is made of a CoCrPt alloy. The film thickness is 10 nm. The saturated magnetization (Ms) is 300 emu/cc. The vertical anisotropic energy is $4.5 \times 10^6$ erg/cc. The magnetic recording medium 300 is magnetized at the oscillation frequency of approximately 45 GHz. It is important to approximate the oscillation frequency of the oscillator 110 to 45 GHz for providing a high SNR. A material for the recording layer 301 may be other than CoCrPt alloys and preferably ensures the vertical magnetic anisotropy. The recording layer 301 can contain multiple layers having different vertical anisotropic energies. In this case, it is preferable that a resonant frequency for magnetizing any of the layers approximately equals an oscillation frequency for the microwave magnetic field of the oscillator 110. The soft magnetic underlayer 302 improves a recording field applied to the recording layer 301 but is not always necessary. The magnetic recording medium 300 can be provided with other layers than the recording layer 301 or the soft magnetic underlayer 302. For example, a protective film may be provided on the recording layer 301 in order to prevent the recording layer 301 from being corroded or prevent characteristics from degrading due to direct contact between the recording layer 301 and the magnetic head slider. An intermediate layer may be provided between the recording layer 301 and the soft magnetic underlayer 302 in order to prevent magnetic coupling between these layers. The magnetic recording medium 300 may be a continuous medium, a discrete track medium, or a patterned medium. The continuous medium contains continuous bits. The discrete track medium is provided with a nonmagnetic region between tracks. The recording head cannot write to the nonmagnetic region. The patterned medium contains a protruded magnetic pattern on a substrate. Recessed portions between the magnetic patterns are filled with a nonmagnetic material.

The oscillator 110 of the recording head section 100 includes an FGL 111, an intermediate layer 112, a spin injection fixing layer 113, and a rotation guide layer 114. The FGL 111 generates a microwave grain boundary. The intermediate layer 112 is made of a material having high permeability. The spin injection fixing layer 113 supplies the FGL 111 with spin torque. The rotation guide layer 114 stabilizes magnetization rotation of the FGL. The oscillator 110 specifies the maximum film thickness of approximately 200 nm in total but does not specify the minimum film thickness. Too large a total thickness of the oscillator 110 excessively increases the distance between the main magnetic pole 120 and the shield 130, and greatly attenuates a magnetic field applied to the oscillator 110 from the main magnetic pole 120. The FGL 111 cannot continuously oscillate the microwave. According to the configuration example, the FGL 111 is made of Fe70Co30 and has the film thickness of 20 nm. Fe70Co30 indicates the saturated magnetization of 2.4 T and is capable of generating a high microwave magnetic field. In addition to FeCo alloys, materials for the FGL 111 may include NiFe alloys, Heusler alloys such as CoFeGe, CoMnGe, CoFeAl, CoFeSi, and CoMnSi, Re-TM amorphous alloys such as TbFeCo, and CoCr alloys. Further, the materials may include CoIr that has negative vertical anisotropic energy. The film thickness of the FGL 111 preferably ranges from 5 nm to 30 nm. The film thickness is set to 5 nm or more because too small a film thickness excessively decreases the microwave magnetic field strength. The film thickness is set to 30 nm or less because too large a film thickness causes many magnetic domains and decreases the magnetic field strength. The intermediate layer 112 according to the embodiment is made of Cu and has the film thickness of 2 nm. Preferable materials for the intermediate layer 112 are nonmagnetic and conductive and may include Au, Ag, Pt, Ta, Ir, Al, Si, Ge, and Ti, for example. The spin injection fixing layer 113 according to the embodiment is made of Co/Pt and has the film thickness of 10 nm. The embodiment uses Co/Pt for which Hk is set to 8 kOe. The use of a vertically anisotropic material for the spin injection fixing layer 113 stabilizes oscillation of the FGL 111. In addition to Co/Pt, it is preferable to use artificial magnetic materials such as Co/Ni, Co/Pd, and CoCrTa/Pd. Though the oscillation becomes less stable, the spin injection fixing layer 113 may use the same materials as used for the FGL 111. The rotation guide layer 114 according to the embodiment is made of Co/Ni having vertical anisotropic energy and has the film thickness of 10 nm. The embodiment uses Co/Ni for which Hk is set to 5 kOe. The rotation guide layer 114 preferably uses the same materials as used for the spin injection fixing layer 113. The oscillator 110 according to the above-mentioned configuration can apply a microwave magnetic field as high as 1.5 kOe or more at a frequency of 40 GHz or higher to the recording layer of the magnetic recording medium 300.

Figure 4:
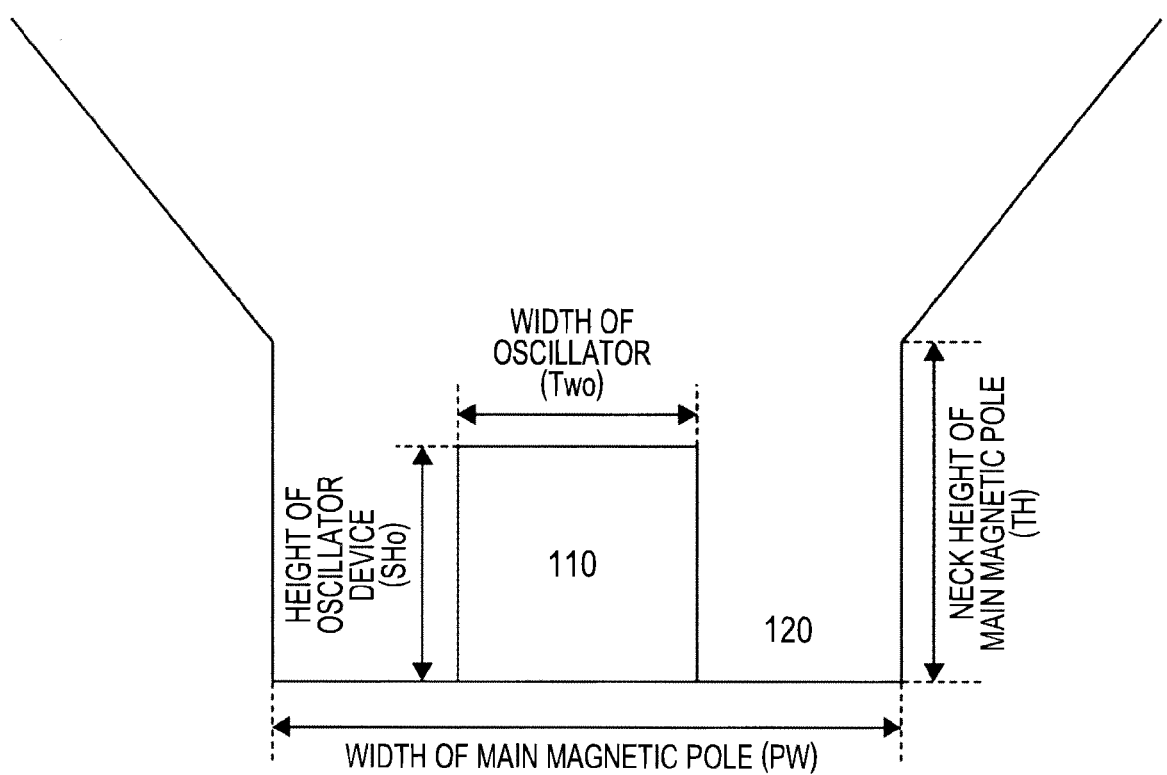
FIG. 4 shows the recording head section according to the first embodiment of the invention viewed from a plane opposite a head travel direction.

According to the embodiment, the main magnetic pole 120 and the shield 130 use a CoFe alloy that features large saturated magnetization and indicates little crystal magnetic anisotropy. FIG. 4 schematically shows the main magnetic pole 120 and the oscillator 110 viewed from a plane opposite the head travel direction. The oscillator 110 is preferably positioned approximately at the center of the main magnetic pole 120. On the oscillator 110, a target value of 40 nm is specified for a width (Two) in the track width direction. Ideally, this width is equivalent to a magnetically recorded width (MWW). A target value of 100 nm is specified for a main magnetic pole width (PW) in the track width direction. A target value of 40 nm is specified for a width (SHo) in the device height direction of the oscillator. A ratio of Two to SHo is preferably designed so as to be greater than or equal to 0.5 and smaller than or equal to 2 from the viewpoint of providing the FGL with a single magnetic domain. When the ratio of Two to SHo is outside the range, a geometric anisotropy field increases to prevent in-plane isotropic oscillation. In the embodiment, the main magnetic pole has the width (PW) of 100 nm in the track width direction. The main magnetic pole has a target value of 60 nm for a neck height (TH) approximately perpendicular to the bottom in the height direction. It is possible to freely design these design values (target values) as the geometric widths for the oscillator 110 and the main magnetic pole 120 so as to provide the high recording density in accordance with the structures of the oscillator 110, the main magnetic pole 120, and the shield 130.

Figure 5:
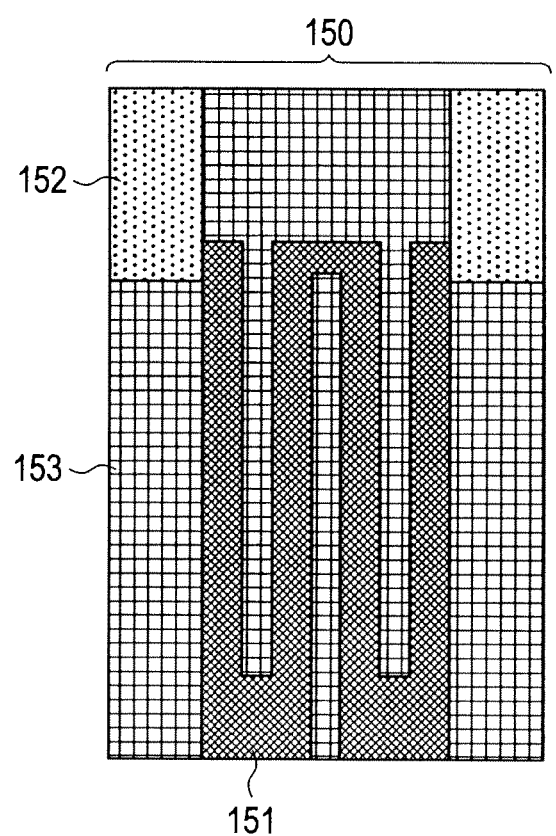
FIG. 5 shows a first thermal expansion device according to the invention.

FIG. 5 shows in detail a configuration example of the first thermal expansion device 150. The first thermal expansion device 150 includes a thin film resistor 151, a thermal expansion device electrode 152, and alumina 153 filled between them. The thin film resistor 151 according to the embodiment uses a serpentine thin wire made of an NiFe alloy. A gap is filled with the alumina to form a heating element. The thin film resistor 151 indicates a resistance value of approximately 50 ohms. Preferable materials for the thin film resistor 151 include not only permalloy but also Cu or other materials with large heat expansion coefficients.

Figure 6:
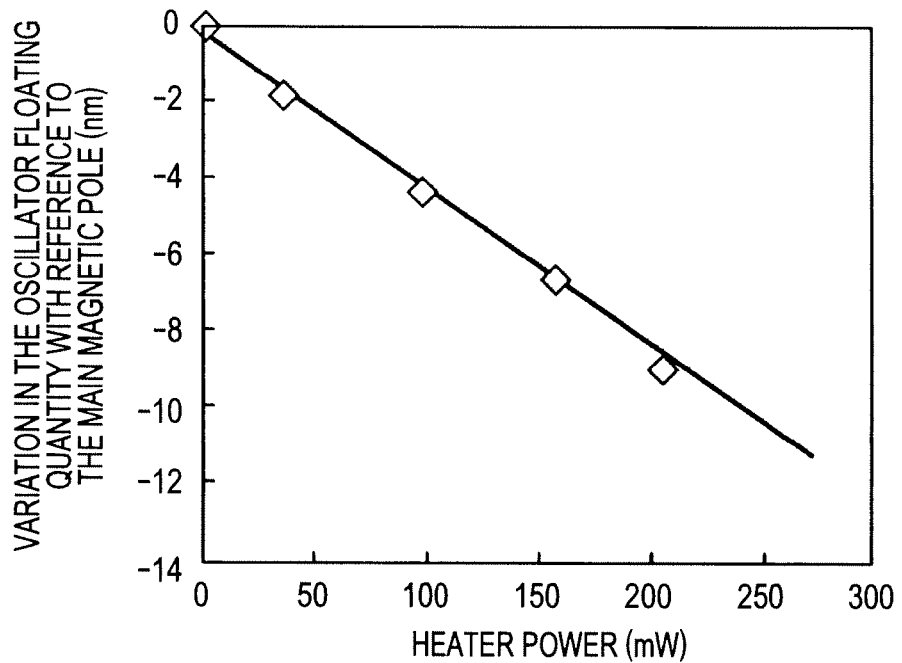
FIG. 6 shows relation between a variation in the oscillator floating quantity with reference to the main magnetic pole and heater power applied to the first thermal expansion device.

FIG. 6 shows the relation between (a) a variation in the distance between the bottom of the oscillator 110 and the surface of the magnetic recording medium 300 with reference to the distance between the bottom of the main magnetic pole 120 and the surface of the magnetic recording medium 300 and (b) the power applied to the first thermal expansion device 150. In the following description, the distance between the bottom of the oscillator 110 and the surface of the magnetic recording medium 300 is referred to as "oscillator floating quantity." The distance between the bottom of the main magnetic pole 120 and the surface of the magnetic recording medium 300 is referred to as "main magnetic pole floating quantity." As seen from FIG. 6, the oscillator is adjusted approximately 5 nm for floating when the heater power of 100 mW is applied. The oscillator 110 alone can be adjusted approximately 10 nm for the floating quantity within a range of actually applicable power.

Optimization Methods and Effects

Based on the first embodiment, the following describes methods and effects of correcting the floating quantity of the oscillator 110 according to the invention in order to compensate for variations in the recording magnetic field strength and the microwave magnetic field strength resulting from variations in the magnetic recording head and the oscillator 110 during the manufacture. The following conditions are assumed. An ideal condition allows the microwave magnetic field strength and the recording magnetic field strength to be equal to design values. Condition 1 causes the microwave magnetic field strength to be less than a target value. Condition 2 causes the recording magnetic field strength to be more than a target value. Condition 3 causes the microwave magnetic field strength to be less than a target value and causes the recording magnetic field strength to be more than a target value. The embodiment provides no effect on characteristic improvement when the microwave magnetic field strength is more than a target value, when the recording magnetic field strength is less than a target value, and when these conditions occur simultaneously. In these cases, the second embodiment is especially effective.

Figure 7:
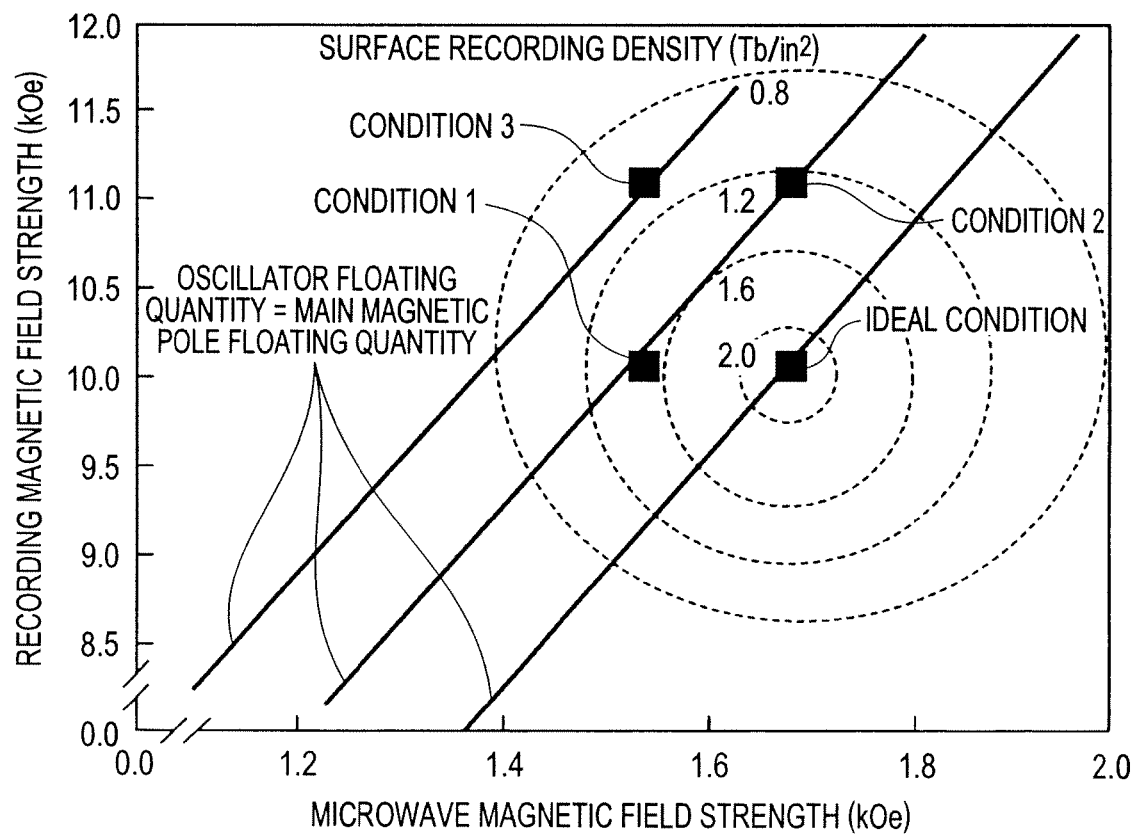
FIG. 7 shows relation between the recording magnetic field strength and the microwave magnetic field strength for providing recording densities.

FIG. 7 shows examples of the microwave magnetic field strength and the recording magnetic field strength needed to provide the high recording density. The oscillation frequency of the microwave magnetic field for the oscillator 110 is set to 45 GHz according to optimization of a current applied to the oscillator. Under the conditions in FIG. 7, the power is applied to the third thermal expansion device so that the oscillator floating quantity and the main magnetic pole floating quantity are both set to 3 nm. The high recording density of 2 Tb/in$^2$ is available under the ideal condition where the microwave magnetic field strength and the recording magnetic field strength match the target values. However, the recording density greatly decreases to 1.2 through 1.6 Tb/in$^2$ under the condition 1, 2, or 3 where the microwave magnetic field strength and/or the recording magnetic field strength deviates from the ideal condition.

With reference to Table 1, the following describes typical causes of deviating the microwave magnetic field strength and the recording magnetic field strength under conditions 1, 2, 3 from the ideal condition. Table 1 shows numeric values under the ideal condition and conditions 1, 2, and 3 in terms of recording magnetic field strength Hrec, microwave magnetic field strength HAC, the main magnetic pole floating quantity, the oscillator floating quantity, neck height TH of the main magnetic pole, device height SHo of the oscillator, SNR, MWW, and recording density AD (Areal Density) at 1500 kfci (kilo-flux-change-per-inch). A decrease or increase in the microwave magnetic field strength as deviation from the ideal condition is mainly caused by an SHo variation resulting from a manufacturing error in the process of forming the oscillator 110 in the device height direction. For example, SHo under condition 1 decreases to 30 nm from 40 nm as the ideal condition. Accordingly, the microwave magnetic field strength decreases to 1.5 kOe from 1.6 kOe as the ideal condition. The higher SHo is, the greater becomes the microwave magnetic field strength. This is because increasing SHo increases the magnetic field strength from the side of the FGL. A deviation of the recording magnetic field strength from the ideal condition is mainly caused by an TH variation resulting from a manufacturing error in the process of forming the main magnetic pole 120 in the device height direction. For example, TH under condition 2 decreases to 50 nm from 60 nm as the ideal condition. Accordingly, the recording magnetic field strength increases to 11 kOe from 10 kOe as the ideal condition. The smaller TH is, the greater becomes the recording magnetic field strength. This is because decreasing TH allows a wide portion of the main magnetic pole approach to the magnetic recording medium. The wide portion is formed at the top of the main magnetic pole with reference to the magnetic recording medium. Condition 3 assumes that SHo decreases to 30 nm from 40 nm as the ideal condition and TH decreases to 50 nm from 60 nm as the ideal condition. Actually, SHo and TH are simultaneously formed in the device height direction during a manufacturing process. The situation most likely causes both SHo and TH to be smaller or greater than the ideal condition. The effect of the invention is unaffected even when any other cause than the above deviates the microwave magnetic field strength and the recording magnetic field strength from the ideal condition.

TABLE 1

|  | Ideal condition | Condition 1 | Condition 2 | Condition 3 |
|---|---|---|---|---|
| Hrec (kOe) | 10 | 10 | 11 | 11 |
| HAC (kOe) | 1.7 | 1.5 | 1.7 | 1.5 |
| Main Magnetic Pole Floating Quantity (nm) | 3.0 | 3.0 | 3.0 | 3.0 |
| Oscillator Floating Quantity (nm) | 3.0 | 3.0 | 3.0 | 3.0 |
| TH (nm) | 60 | 60 | 50 | 50 |
| SHo (nm) | 40 | 30 | 40 | 30 |
| SNR (dB) | 15 | 12 | 15 | 13 |
| MWW (nm) | 40 | 37 | 62 | 60 |
| A.D (Tb/in$^2$) | 2.0 | 1.6 | 1.3 | 1.1 |

With reference to FIG. 7 and Table 1, the following describes the cause of an excessive decrease in the recording density when the microwave magnetic field strength and the recording magnetic field strength deviate from the ideal condition. The recording density almost depends on the signal quality (SNR) for determining the linear recording density and the magnetic track width (MWW) for determining the track density. The high recording density must satisfy both the high SNR and the narrow MWW. According to Table 1, the recording density of 2.0 Tb/in$^2$ requires the SNR of approximately 15 dB and the MWW of approximately 40 nm. To achieve the SNR of approximately 15 dB, the microwave magnetic field strength must be 1.6 kOe or more and the recording magnetic field strength must be 9.5 kOe or more. When either condition is not satisfied, the SNR remarkably degrades and decreases the recording density. Under condition 1, for example, the microwave magnetic field strength decreases to 1.5 kOe. The SNR greatly decreases to 12 dB. To achieve the narrow MWW of 40 nm, the microwave magnetic field strength must be 1.7 kOe or less and the recording magnetic field strength must be 10.3 kOe or less. When the microwave magnetic field strength or the recording magnetic field strength is too high, the MWW drastically increases. Under condition 2 or 3, the recording magnetic field strength increases to 11 kOe. The MWW increases to approximately 60 nm. Therefore, both the microwave magnetic field strength and the recording magnetic field strength need to be optimized in order to provide the high recording density.

Figure 8:
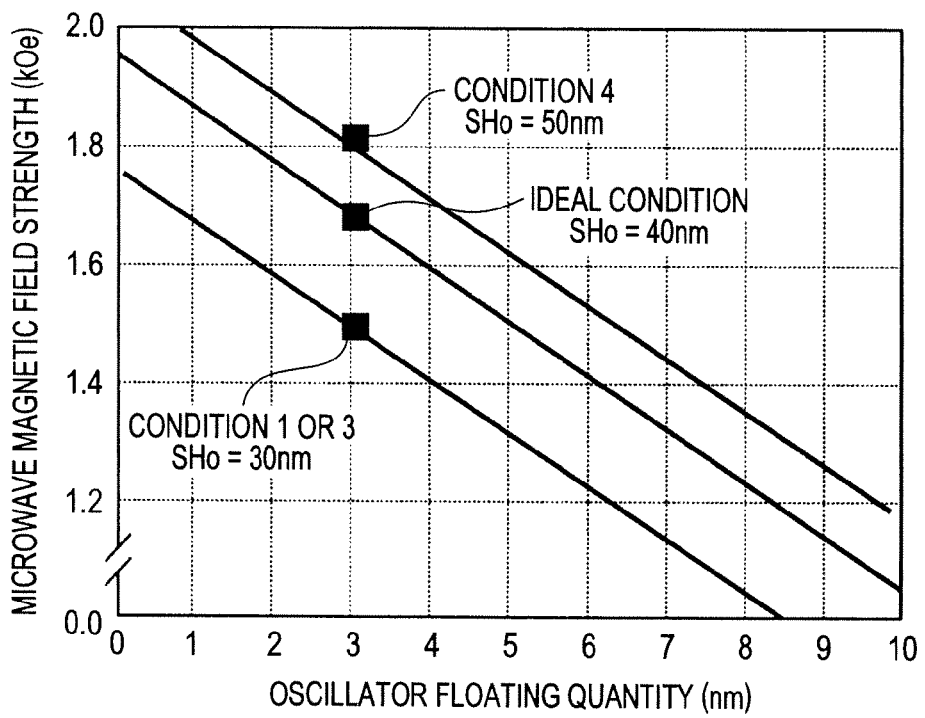
FIG. 8 shows relation between the microwave magnetic field strength and the floating quantity of the oscillator.
Figure 9:
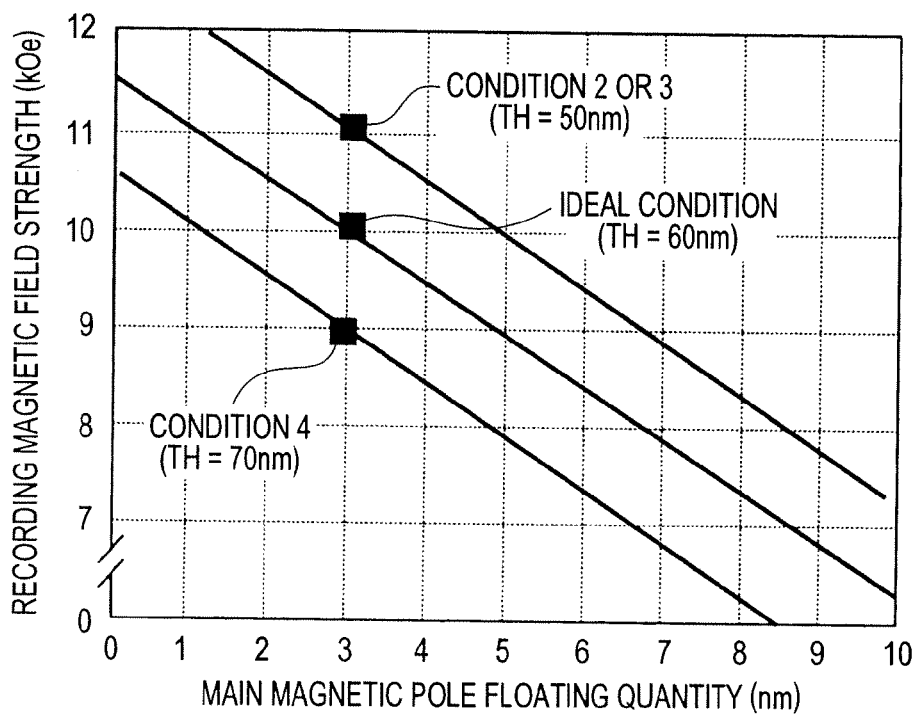
FIG. 9 shows relation between the recording magnetic field strength and the floating quantity of the main magnetic pole.

The embodiment features adjustment of the relative distance between the oscillator 110 and the main magnetic pole 120. When condition 1, 2, or 3 does not use this relative distance adjustment, however, the recording density cannot be improved up to 2.0 Tb/in$^2$ under the ideal condition through optimization of the recording current to the manufactured magnetic recording head or the power applied to the thermal expansion device. Under condition 2, for example, the recording magnetic field strength may be optimized by varying the recording current. On the other hand, the oscillation frequency varies and may decrease the recording density. Controlling the power applied to the third thermal expansion device can control the oscillator floating quantity and the main magnetic pole floating quantity. The microwave magnetic field strength and the recording magnetic field strength can be varied simultaneously, however, in conjunction with each other. It is impossible to simultaneously satisfy the ideal condition for the microwave magnetic field strength and that for the recording magnetic field strength. Three solid lines in FIG. 7 depict changes in the microwave magnetic field strength and the recording magnetic field strength when the power is applied to the third thermal expansion device under the ideal condition and conditions 1, 2, and 3. It can be understood that only controlling the third thermal expansion device cannot provide a high recording density. FIGS. 8 and 9 show dependency of the microwave magnetic field strength on the oscillator floating quantity and dependency of the recording magnetic field strength on the main magnetic pole floating quantity, respectively. As shown in FIGS. 8 and 9, the microwave magnetic field strength and the recording magnetic field strength linearly vary with the floating quantity approximately up to 10 nm. As depicted by three solid lines in FIG. 7, the recording magnetic field strength and the microwave magnetic field strength always keep a constant ratio.

The following describes an example method of adjusting floating quantities of the oscillator 110 and the main magnetic pole 120 under specific conditions 1, 2, and 3 based on the structural feature of the invention.

TABLE 2

|  | Ideal condition | Condition 1 | Condition 1' |
|---|---|---|---|
| Hrec (kOe) | 10 | 10 | 10 |
| HAC (kOe) | 1.7 | 1.5 | 1.7 |
| Main Magnetic Pole Floating Quantity (nm) | 3.0 | 3.0 | 3.0 |
| Oscillator Floating Quantity (nm) | 3.0 | 3.0 | 1.0 |
| TH (nm) | 60 | 60 | 60 |
| SHo (nm) | 40 | 30 | 30 |
| SNR (dB) | 15 | 12 | 15 |
| MWW (nm) | 40 | 37 | 40 |
| A.D (Tb/in$^2$) | 2.0 | 1.6 | 2.0 |

With reference to Table 2, the following describes a method of optimizing the microwave magnetic field strength and its effect under condition 1. Under condition 1, only the microwave magnetic field strength is less than the ideal condition. To increase only the microwave magnetic field strength, it is only necessary to decrease the floating quantity of the oscillator 110. From FIG. 8, it is understood that the microwave magnetic field strength of 1.7 kOe as the ideal condition is available by decreasing the oscillator floating quantity to 1 nm from 3 nm by reducing 2 nm. To do this, the heater power of 40 mW needs to be applied to the first thermal expansion device 150 as seen from FIG. 6. In this case, the microwave magnetic field strength, the recording magnetic field strength, and the surface recording density are given as condition 1' in Table 2. The above-mentioned method can solve a decrease in the microwave magnetic field strength under condition 1 and restore the recording density to a value equal to the ideal condition.

TABLE 3

|  | Ideal condition | Condition 2 | Condition 2' | Condition 2" |
|---|---|---|---|---|
| Hrec (kOe) | 10 | 11 | 10 | 10 |
| HAC (kOe) | 1.7 | 1.7 | 1.5 | 1.7 |
| Main Magnetic Pole Floating Quantity | 3.0 | 3.0 | 5.0 | 5.0 |

TABLE 3-continued

|  | Ideal condition | Condition 2 | Condition 2' | Condition 2" |
|---|---|---|---|---|
| Oscillator Floating Quantity (nm) | 3.0 | 3.0 | 5.0 | 3.0 |
| TH (nm) | 60 | 50 | 50 | 50 |
| SHo (nm) | 40 | 40 | 40 | 40 |
| SNR (dB) | 15 | 15 | 12 | 15 |
| MWW (nm) | 40 | 62 | 37 | 40 |
| A.D (Tb/in$^2$) | 2.0 | 1.3 | 1.6 | 2.0 |

With reference to Table 3, the following describes a method of optimizing the recording magnetic field strength and its effect under condition 2. Under condition 2, only the recording magnetic field strength is greater than the ideal condition. To decrease only the recording magnetic field strength, it is only necessary to increase the floating quantity of the main magnetic pole 120. From FIG. 9, it is understood that the recording magnetic field strength of 10 kOe as the ideal condition is available by increasing the main magnetic pole floating quantity to 5 nm from 3 nm using the third thermal expansion device. At the same time, however, the oscillator floating quantity increases to 5 nm, decreasing the recording density. This state is defined as condition 2'. To restore the oscillator floating quantity of 5 nm to 3 nm as the ideal condition, the heater power of 40 mW is applied to the first thermal expansion device 150. This state is defined as condition 2" and is capable of providing the microwave magnetic field strength and the recording magnetic field strength equivalent to the ideal condition. The above-mentioned method can solve an increase in the microwave magnetic field strength under condition 2 and restore the recording density to a value equal to the ideal condition.

TABLE 4

|  | Ideal condition | Condition 3 | Condition 3' | Condition 3" |
|---|---|---|---|---|
| Hrec (kOe) | 10 | 11 | 10 | 10 |
| HAC (kOe) | 1.7 | 1.5 | 1.3 | 1.7 |
| Main Magnetic Pole Floating Quantity (nm) | 3.0 | 3.0 | 5.0 | 5.0 |
| Oscillator Floating Quantity (nm) | 3.0 | 3.0 | 5.0 | 1.0 |
| TH (nm) | 60 | 50 | 50 | 50 |
| SHo (nm) | 40 | 30 | 30 | 30 |
| SNR (dB) | 15 | 13 | 6 | 15 |
| MWW (nm) | 40 | 60 | 33 | 40 |
| A.D (Tb/in$^2$) | 2.0 | 1.1 | 0.7 | 2.0 |

With reference to Table 4, the following describes a method of optimizing the recording magnetic field strength and its effect under condition 3. Condition 3 uses the same procedure as condition 2 to optimize the floating quantity. To provide the recording magnetic field strength of 10 kOe as the ideal condition, it is only necessary to increase the main magnetic pole floating quantity from 3 nm to 5 nm using the third thermal expansion device. However, the oscillator floating quantity also increases to 5 nm. The microwave magnetic field strength decreases to 1.3 kOe from 1.5 kOe as the original value. As a result, the recording density decreases. This state is defined as condition 3'. To increase the microwave magnetic field strength from 1.3 kOe to 1.7 kOe as the ideal condition, the oscillator floating quantity needs to be decreased to 1 nm from 5 nm based on the relation between the microwave magnetic field strength and the oscillator floating quantity as shown in FIG. 8. The oscillator floating quantity only needs to be decreased by 4 nm. It just needs to apply the heater power of 100 mW to the first thermal expansion device 150 as seen from FIG. 6. This state is defined as condition 3" and is capable of providing the microwave field strength and the recording field strength equivalent to the ideal condition. The above-mentioned method can optimize both the recording field strength and the microwave magnetic field strength under condition 3 so as to satisfy the ideal condition and restore the recording density to a value equal to the ideal condition.

As mentioned above, manufacturing errors in the oscillator 110 and the main magnetic pole 120 cause the oscillator 100 to decrease the microwave magnetic field strength from the target value, cause the main magnetic pole 120 to increase the recording magnetic field strength from the target value, and cause the recording density to decrease when both the oscillator 110 and the main magnetic pole 120 simultaneously do not satisfy the target values. The embodiment independently adjusts floating quantities for the oscillator 110 and the main magnetic pole 120, making it possible to independently adjust the recording magnetic field strength and the microwave magnetic field strength and prevent the recording density from decreasing.

Second Embodiment

Figure 10:
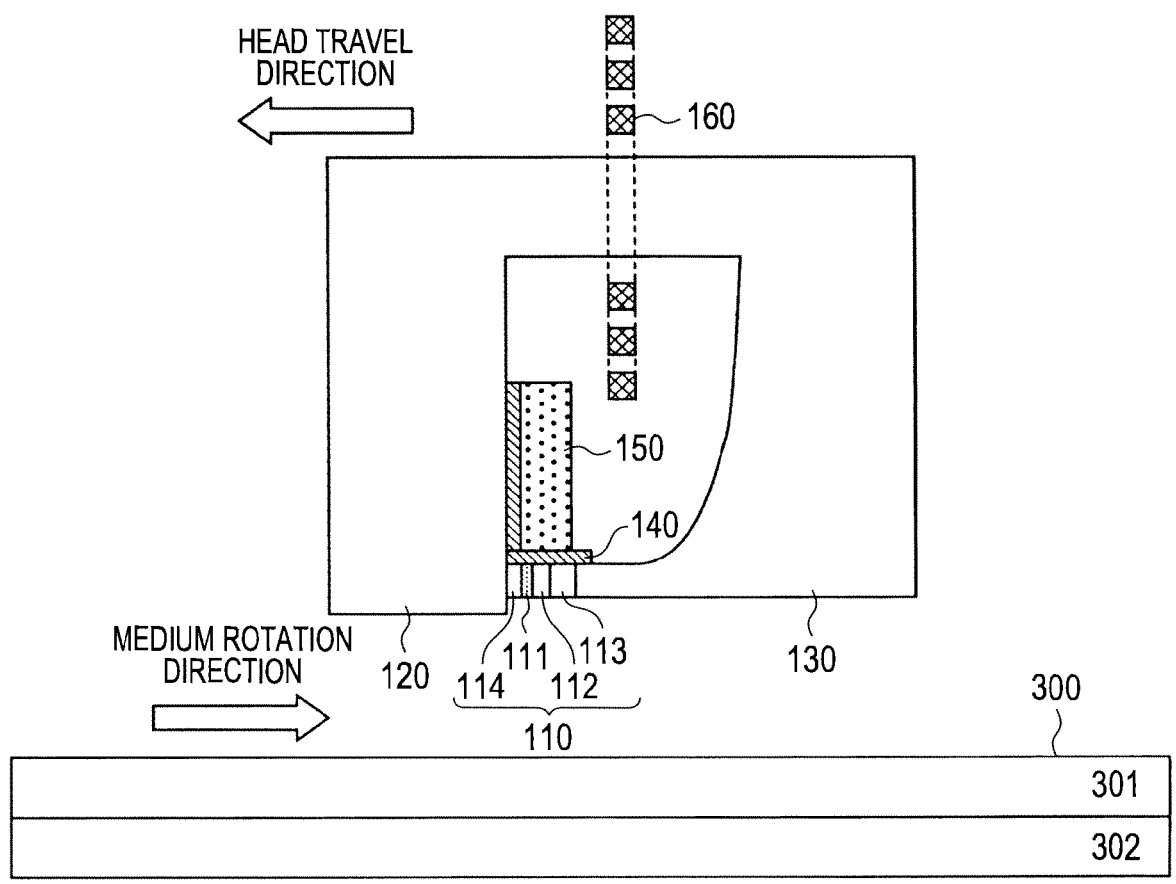
FIG. 10 shows a recording head section according to a second embodiment of the invention.

The second embodiment of the invention will be described. The embodiment differs from the first embodiment only in the configuration of the recording head section 100. The following omits the description about duplicate part of the magnetic read/write apparatus according to the first embodiment other than the recording head section 100. FIG. 10 illustrates an enlarged view of the recording head section 100 according to the embodiment. FIG. 10 assumes that no power is applied to the first thermal expansion device 150 or the third thermal expansion device. A feature of the embodiment is that the bottom face of the oscillator 110 is higher than that of the main magnetic pole 120 in the device height direction. The embodiment specifies a relative distance of 4 nm between the oscillator 110 and the main magnetic pole 120 when no power is applied to the first thermal expansion device 150. In FIG. 10, the shield 130 is at the same level as the oscillator 110 but may be at the same level as the main magnetic pole 120. Similarly to the first embodiment, the second embodiment can also independently adjust the recording magnetic field strength and the microwave magnetic field strength from the main magnetic pole 120 and the oscillator 110. The embodiment can compensate for deviation from the target value for the magnetic field strength due to a manufacturing error and improve the recording density. The first embodiment is effective when the recording magnetic field strength is greater than the target value, when the microwave magnetic field strength is smaller than the target value, and when these cases occur simultaneously. In addition to these cases, the second embodiment is also effective when the recording magnetic field strength is smaller than the target value, when the microwave magnetic field strength is greater than the target value, and when these cases occur simultaneously.

TABLE 5

|  | Ideal condition | Condition 3 | Condition 4 |
| --- | --- | --- | --- |
| Hrec (kOe) | 10 | 11 | 9 |
| HAC (kOe) | 1.7 | 1.5 | 1.8 |
| Main Magnetic Pole Floating Quantity (nm) | 3.0 | 3.0 | 3.0 |
| Oscillator Floating Quantity (nm) | 3.0 | 3.0 | 3.0 |
| TH (nm) | 60 | 50 | 70 |
| SHo (nm) | 40 | 30 | 50 |
| SNR (dB) | 15 | 13 | 13 |
| MWW (nm) | 40 | 60 | 58 |
| A.D (Tb/in²) | 2.0 | 1.1 | 1.1 |

Figure 11:
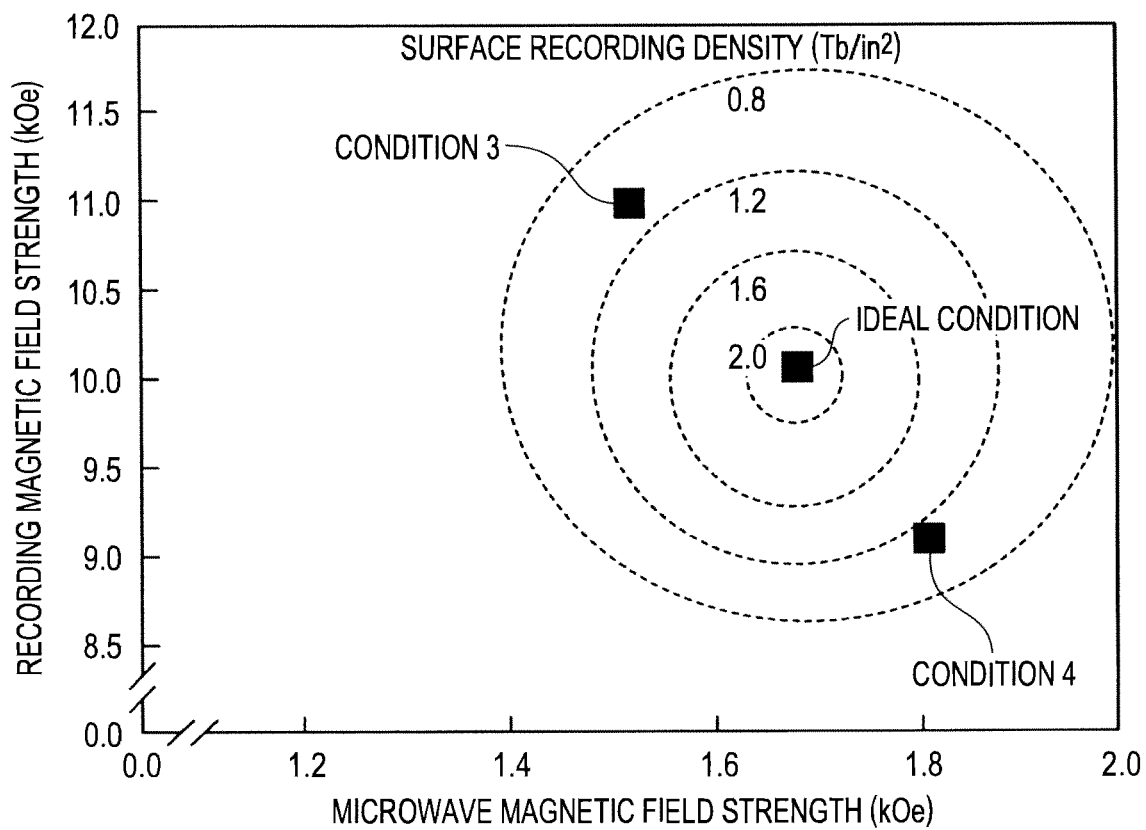
FIG. 11 shows relation between the recording magnetic field strength and the microwave magnetic field strength for providing recording densities.

The following describes a method of adjusting floating quantities for the oscillator and the main magnetic pole when the recording magnetic field strength or the microwave magnetic field strength deviates from the target value. FIG. 11 and Table 5 show numeric values and resulting recording densities under the ideal condition, and conditions 3 and 4. The ideal condition indicates that the recording magnetic field strength and the microwave magnetic field strength satisfy the target values. Condition 3 indicates that the recording magnetic field strength is greater than the ideal condition and the microwave magnetic field strength is smaller than the target value. Condition 4 indicates that the recording magnetic field strength is smaller than the ideal condition and the microwave magnetic field strength is greater than the target value. The ideal condition and condition 3 are basically the same as those used for the first embodiment. The only difference is that the power of 70 mW is already applied to the first thermal expansion device 150 so that the oscillator floating quantity equals the main magnetic pole floating quantity.

The following describes a procedure for optimizing floating quantities for the oscillator and the main magnetic pole under conditions 3 and 4. The procedure under condition 3 is basically the same as the first embodiment. The first thermal expansion device 150 and the third thermal expansion device only need to be adjusted so as to satisfy the oscillator floating quantity and the main magnetic pole floating quantity as described under condition 3" in Table 4. In the configuration according to the first embodiment, condition 3" only requires applying the power of 100 mW to the first thermal expansion device 150. In the configuration according to the second embodiment, the power of 70 mW is applied already under condition 3. The power of 170 mW needs to be applied finally. The second embodiment can optimize conditions 1, 2, and 3 described in the first embodiment just by applying the power to the thermal expansion device 70 mW more than the first embodiment.

TABLE 6

|  | Ideal condition | Condition 4 | Condition 4' |
| --- | --- | --- | --- |
| Hrec (kOe) | 10 | 9 | 10 |
| HAC (kOe) | 1.7 | 1.8 | 1.7 |
| Main Magnetic Pole Floating Quantity (nm) | 3.0 | 3.0 | 1.0 |
| Oscillator Floating Quantity (nm) | 3.0 | 3.0 | 4.5 |
| Power applied to thermal expansion device (mW) | 70 | 70 | 20 |
| TH (nm) | 60 | 70 | 70 |
| SHo (nm) | 40 | 50 | 50 |
| SNR (dB) | 15 | 13 | 15 |
| MWW (nm) | 40 | 58 | 40 |
| A.D (Tb/in²) | 2.0 | 1.1 | 2.0 |

The optimization procedure under condition 4 is basically the same as that under condition 3. The following describes an optimization example with reference to FIGS. 8 and 9 and Table 6. First, it is necessary to recover from a decrease in the recording magnetic field strength from the ideal condition. To do this, the third thermal expansion device is used to decrease the main magnetic pole floating quantity. The main magnetic pole floating quantity just needs to be set to 1 nm based on the relation between the recording magnetic field strength and floating quantity in FIG. 9. In this case, the oscillator floating quantity also decreases to 1 nm. It is found that the microwave magnetic field strength is set to approximately 2.0 kOe as seen from FIG. 8. The microwave magnetic field strength needs to be decreased to 1.7 kOe as the ideal condition. To do this, the oscillator floating quantity needs to be set to 4.5 nm based on the relation between the microwave magnetic field strength and the oscillator floating quantity. Since the oscillator floating quantity is currently set to 1 nm, it just needs to be increased by 3.5 nm. At the present, the power of 70 mW is applied to decrease the floating quantity 4 nm. To increase the floating quantity 3.5 nm, it is understood from FIG. 6 that the heater power is set to 20 mW.

According to the above-mentioned configuration and optimization, the second embodiment can compensate for variations in the recording magnetic field strength and the microwave magnetic field strength in a wider range than the first embodiment and can provide high recording density.

Third Embodiment

Figure 12:
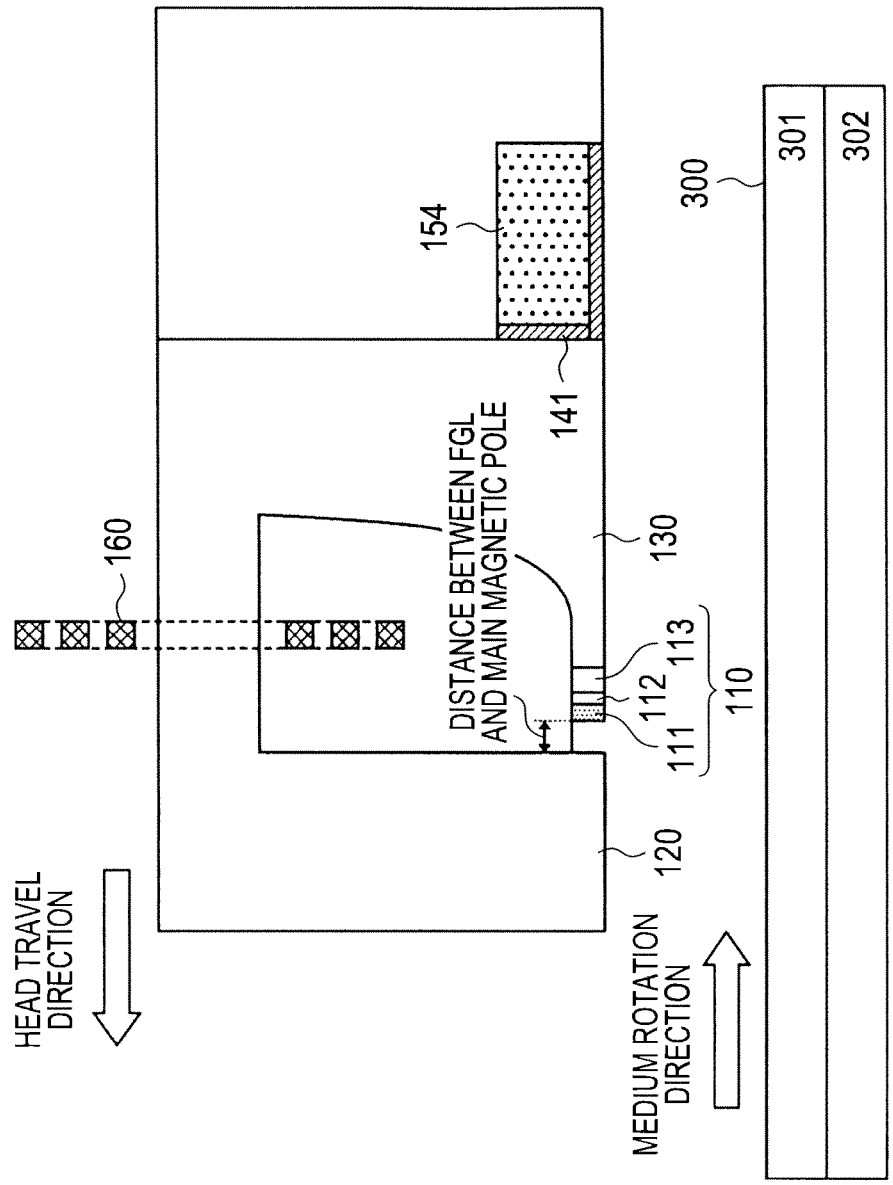
FIG. 12 shows a recording head section according to a third embodiment of the invention.

The third embodiment of the invention will be described. The embodiment differs from the first embodiment only in the configuration of the recording head section 100. The following omits the description about duplicate part of the magnetic read/write apparatus according to the first embodiment other than the recording head section 100. FIG. 12 illustrates an enlarged view of the recording head section 100 according to the embodiment. According to the configuration of the first embodiment, the thermal expansion device 150 is positioned over the oscillator. According to the configuration of the third embodiment, a second thermal expansion device 154 is provided to the rear of the shield 130 viewed from the oscillator 110. An insulation layer 141 is provided between the second thermal expansion device 154 and the shield 130. FIG. 12 assumes that no power is applied to the second thermal expansion device 154. According to the configuration of the first or second embodiment, the rotation guide layer 114 is provided between the FGL 111 and the main magnetic pole 120 of the oscillator 110. According to the configuration of the third embodiment, a gap is provided between the FGL 111 and the main magnetic pole 120 of the oscillator 110. This configuration can greatly vary the distance between the FGL and the main magnetic pole when the power is applied to the second thermal expansion device 154. As another configuration, the rotation guide layer 114 may be provided between the FGL 111 and the main magnetic pole 120 and a gap may be provided between the rotation guide layer 114 and the main magnetic pole 120. A gap may be replaced by a conductive organic material having small Young's modulus. Except the above-mentioned configuration, the third embodiment is identical to the first or second embodiment. The most distinctive feature of the third embodiment is capability of adjusting the distance between the FGL 111 and the main magnetic pole 120 in the head travel direction. The microwave field strength can be adjusted. As a result, it is possible to compensate for variations in the microwave magnetic field strength or the recording magnetic field strength due to manufacturing errors on the oscillator 110 and the main magnetic pole 120.

TABLE 7

|  | Ideal condition | Condition 5 | Condition 5" |
|---|---|---|---|
| Hrec (kOe) | 10 | 10 | 10 |
| HAC (kOe) | 1.7 | 1.9 | 1.7 |
| Distance between FGL and main magnetic pole (nm) | 10 | 10 | 12 |
| Backward thermal expansion device power (mW) | 130 mW | 130 mW | 60 mW |
| TH (nm) | 60 | 60 | 60 |
| SHo (nm) | 40 | 60 | 40 |
| SNR (dB) | 15 | 15 | 15 |
| MWW (nm) | 40 | 64 | 40 |
| A.D (Tb/in$^2$) | 2.0 | 1.0 | 2.0 |

Figure 13:
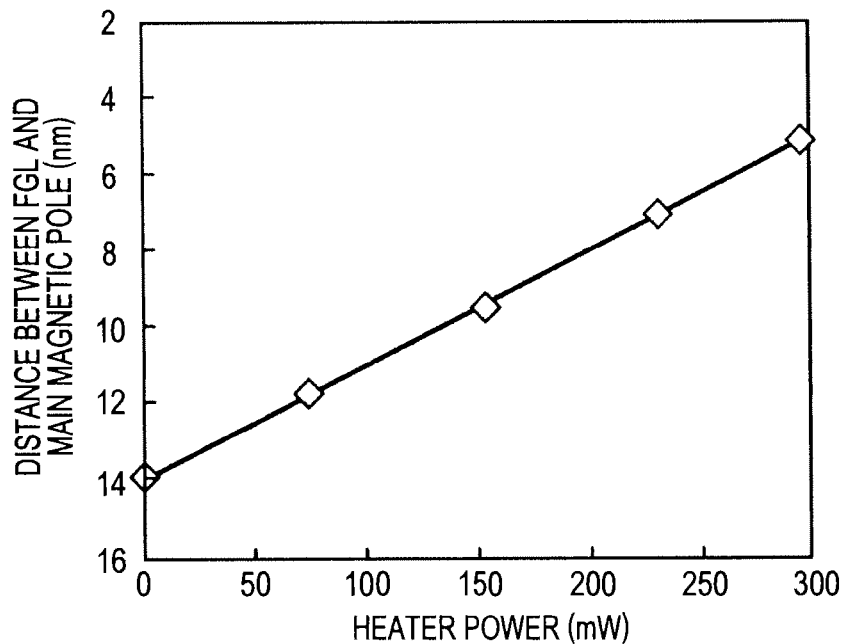
FIG. 13 shows relation of the distance between FGL and the main magnetic pole with heater power applied to a second thermal expansion device according to the third embodiment of the invention.
Figure 14:
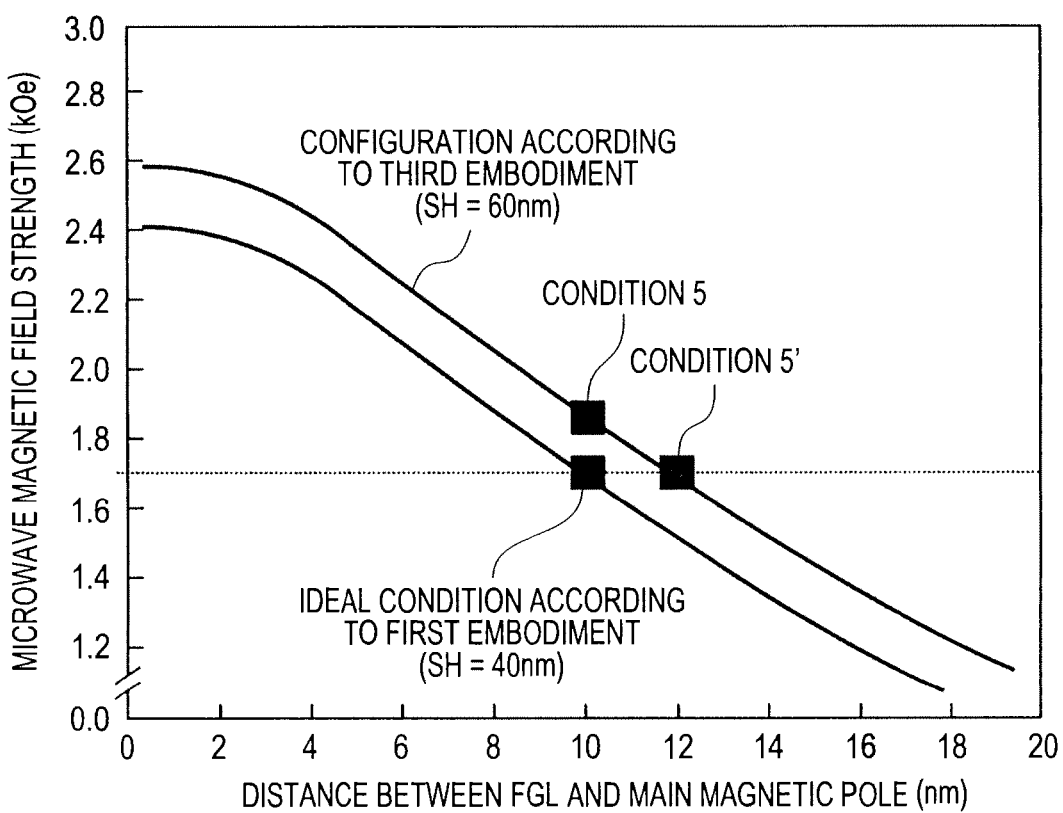
FIG. 14 shows relation of the microwave magnetic field strength with the distance between FGL and the main magnetic pole.

With reference to FIGS. 13 and 14 and Table 7, the following describes a method and effects of optimizing a distance between the FGL and the main magnetic pole by applying the power to the second thermal expansion device 154. FIG. 13 shows the relation of the distance between the FGL and the main magnetic pole with the heater power applied to the second thermal expansion device 154. The embodiment assumes a gap of 14 nm between the FGL and the main magnetic pole while no power is applied to the second thermal expansion device 154. Increasing the heater power expands the second thermal expansion device 154 and accordingly decreases the distance between the FGL and the main magnetic pole to a value smaller than 14 nm.

FIG. 14 shows the relation of the microwave magnetic field strength with the distance between the FGL and the main magnetic pole. Decreasing the distance between the FGL and the main magnetic pole increases the microwave magnetic field strength. The microwave magnetic field strength can be controlled by controlling the power supplied to the second thermal expansion device 154.

Table 7 shows geometric dimensions of components, the microwave magnetic field strength, and the recording magnetic field strength under an ideal condition of manufacturing the oscillator 110 as designed and condition 5 of increasing the microwave magnetic field strength from a target value for the oscillator 110. The ideal condition according to the embodiment uses 10 nm for the distance between the FGL and the main magnetic pole. The power of 140 mW is applied in order to decrease the distance between the FGL and the main magnetic pole from 14 nm to 10 nm using the relation of the distance between the FGL and the main magnetic pole with the heater power applied to the second thermal expansion device 154 shown in FIG. 13. Condition 5 increases SHo of the oscillator 110 to 60 nm from the target value of 40 nm under the ideal condition. As seen from Table 7, the microwave magnetic field strength increases to 1.9 kOe from 1.7 kOe as the ideal condition. The microwave magnetic field strength needs to be decreased to 1.7 kOe from 1.9 kOe. To do this, it can be seen from FIG. 14 that the distance between the FGL and the main magnetic pole needs to be increased to 12 nm from 10 nm. To do this, it can be seen from FIG. 13 that the power of 60 mW needs to be applied to the second thermal expansion device 154. The above-mentioned procedure can compensate for variations in the microwave magnetic field strength due to manufacturing errors on the oscillator 110 and prevent the recording density from decreasing.

The third embodiment has been described only the case of the microwave magnetic field strength deviating from the ideal condition. The embodiment can also optimize the microwave magnetic field strength and the recording magnetic field strength by combining control of the third thermal expansion device and adjustment of the second thermal expansion device 154 similarly to the first and second embodiments even when the recording magnetic field strength or the microwave magnetic field strength and the recording magnetic field strength both deviate from the ideal conditions.

Fourth Embodiment

The fourth embodiment of the invention will be described. The embodiment differs from the first embodiment only in the configuration of the recording head section 100. The following omits the description about duplicate part of the magnetic read/write apparatus according to the first embodiment other than the recording head section 100. FIG. 15 illustrates an enlarged view of the recording head section 100 according to the embodiment. A feature of the embodiment is that the first thermal expansion device 150 is provided over the oscillator 110 and the second thermal expansion device 154 is provided to the rear of the shield 130 viewed from the main magnetic pole 120. Similarly to the first, second, and third embodiments, the fourth embodiment also features adjustment of the basic microwave magnetic field strength or recording magnetic field strength. Further, the fourth embodiment can adjust a wider range of the microwave magnetic field strength and the recording magnetic field strength and allows a wider range of manufacturing errors than the first, second, and third embodiments.

The invention claimed is:
1. A microwave-assisted magnetic recording head comprising:
   a main magnetic pole that generates a recording magnetic field to be recorded on a magnetic recording medium;
   a shield;
   an oscillator that is provided between the main magnetic pole and the shield and generates a microwave magnetic field; and
   a feature for adjusting a relative position between the oscillator and the main magnetic pole,
   wherein the feature for adjusting a relative position adjusts a relative distance between a bottom face of the oscillator and a bottom face of the main magnetic pole in a height direction of a plane facing to the recording medium.

2. The microwave-assisted magnetic recording head according to claim 1,
wherein the feature for adjusting a relative distance in a height direction includes:
a first thermal expansion device that is provided opposite a face of the oscillator facing to the recording medium;
an insulation layer that is made of an insulating material and is provided between the oscillator and the first thermal expansion device; and
an electrode for applying an electric current to the first thermal expansion device.

3. The microwave-assisted magnetic recording head according to claim 2,
wherein the bottom face of the oscillator is higher than the bottom face of the main magnetic pole with reference to the recording medium while no electric current is applied to the first thermal expansion device.

4. The microwave-assisted magnetic recording head according to claim 2,
wherein the bottom face of the oscillator levels with the bottom face of the main magnetic pole while no electric current is applied to the first thermal expansion device.

5. The microwave-assisted magnetic recording head according to claim 1,
wherein the feature for adjusting a relative position further includes
a feature for adjusting a relative distance between the oscillator and the main magnetic pole in a head travel direction.

6. The microwave-assisted magnetic recording head according to claim 5,
wherein the feature for adjusting a relative distance in a height direction includes:
a first thermal expansion device that is provided opposite a face of the oscillator facing to the recording medium;
an insulation layer that is made of an insulating material and is provided between the oscillator and the first thermal expansion device; and
an electrode for applying an electric current to the first thermal expansion device;
wherein the feature for adjusting a relative distance in a head travel direction includes:
a second thermal expansion device provided for the shield opposite the oscillator;
an insulation layer that is made of an insulating material and is provided between and adjacent to the shield and the second thermal expansion device; and
an electrode for applying an electric current to the second thermal expansion device.

7. The microwave-assisted magnetic recording head according to claim 1, further comprising:
a feature that simultaneously adjusts positions of the main magnetic pole and the oscillator in a height direction of a plane facing to the recording medium.

8. The microwave-assisted magnetic recording head according to claim 7,
wherein the feature for adjusting positions of the main magnetic pole and oscillator in a height direction is equivalent to a thermal expansion device.

9. The microwave-assisted magnetic recording head according to claim 1,
wherein the oscillator includes a microwave magnetic field generation layer.

10. The microwave-assisted magnetic recording head according to claim 9,
wherein the oscillator includes a spin injection fixing layer, an intermediate layer, a microwave magnetic field generation layer, and a rotation guide layer.

11. A magnetic read/write apparatus comprising:
a microwave-assisted magnetic recording head including:
a main magnetic pole that generates a recording field to be recorded on a magnetic recording medium; a shield; an oscillator that is provided between the main magnetic pole and the shield and generates a microwave magnetic field; and a feature for adjusting a relative distance between a bottom face of the oscillator and a bottom face of the main magnetic pole in a height direction of a plane facing to the recording medium;
a magnetic read head that reads information from a magnetic recording medium; and
a signal processing means that processes a signal written by the magnetic recording head and a signal read by the magnetic read head.

12. The magnetic read/write apparatus according to claim 11,
wherein the feature of the microwave-assisted magnetic recording head further includes
a feature for adjusting a relative distance between the oscillator and the main magnetic pole in a head travel direction.

* * * * *